United States Patent [19]

Gavit

[11] Patent Number: 5,777,823
[45] Date of Patent: Jul. 7, 1998

[54] TAPE TRANSPORT APPARATUS INCORPORATING POROUS AIR BEARING

[76] Inventor: Stephan E. Gavit, 11480 W. Bear Creek Dr., Lakewood, Colo. 80227

[21] Appl. No.: 607,638

[22] Filed: Feb. 27, 1996

[51] Int. Cl.$^6$ ........................................... G11B 15/60
[52] U.S. Cl. ...................... 360/102; 360/130.21; 242/548
[58] Field of Search .................... 360/102, 130.21, 360/130.23, 130.2; 242/346, 615.4, 547, 548

[56] References Cited

U.S. PATENT DOCUMENTS

| | | | |
|---|---|---|---|
| 3,840,894 | 10/1974 | Arseneault | 360/102 |
| 3,961,369 | 6/1976 | Baumann et al. | 360/102 |
| 5,155,639 | 10/1992 | Platter et al. | 360/95 |

FOREIGN PATENT DOCUMENTS 61-237252  10/1986  Japan .................. 360/130.21

OTHER PUBLICATIONS

IBM Technical Disclosure Bulletin, "Air Supported Compliant Tape Guide", vol. 17, #4, Sep. 1974, p. 966, P.J. Arseneault et al.

*Primary Examiner*—Stuart S. Levy
*Assistant Examiner*—Kevin M. Watkins
*Attorney, Agent, or Firm*—Timothy J. Martin; Michael R. Henson

[57] ABSTRACT

A linear-type tape transport includes a pair of air bearings on each side of a transducer when viewed in reference to the tape transport direction. Each air bearing includes a housing and a bear member formed of a porous material. The housing and the bearing member form a plenum connectable to a pressurized air source such that air flow through the porous material creates an air cushion to support a tape medium during transport. The porous material is preferably a ceramic that is between two and fifty percent open. The bearing member has a datum face with the bearing surface thereof being planar and at a small obtuse angle to the datum face thereby to automatically urge an edge of the tape against the datum face. The housing is preferably U-shaped in cross-section with an arcuate bottom and parallel sidewalls.

27 Claims, 3 Drawing Sheets

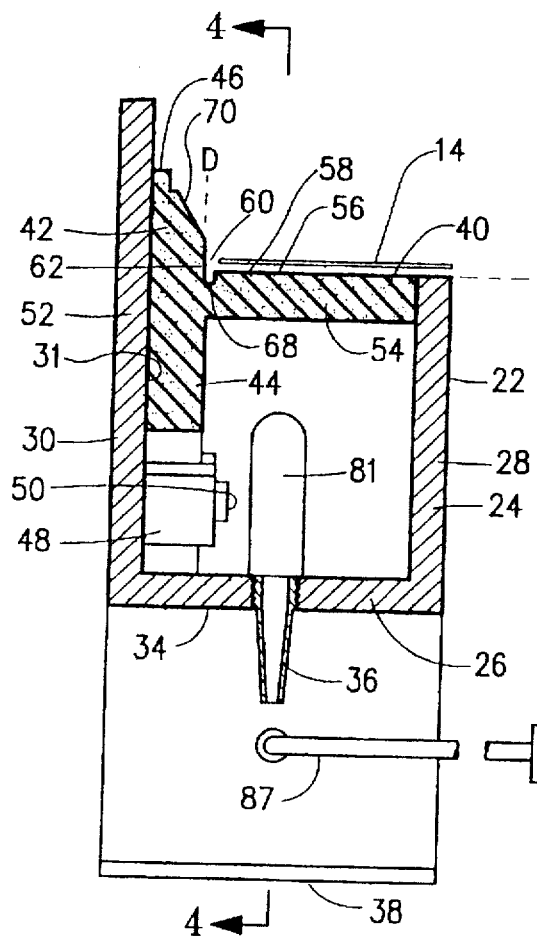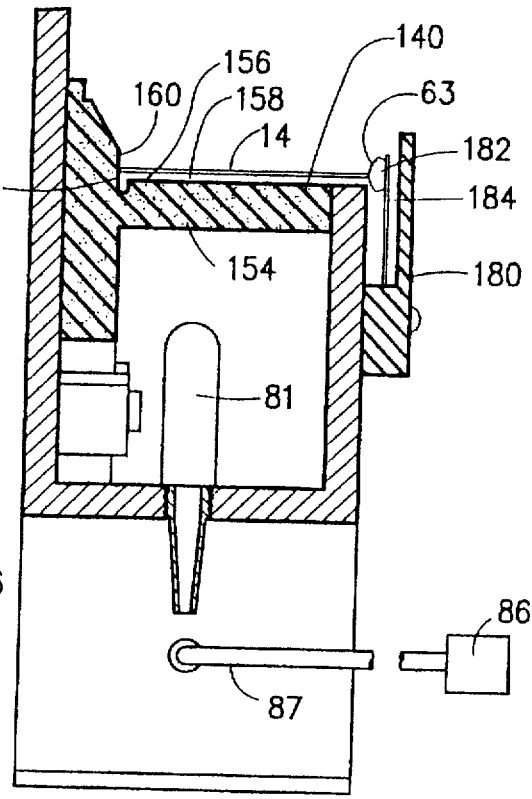
Fig.3                    Fig.7
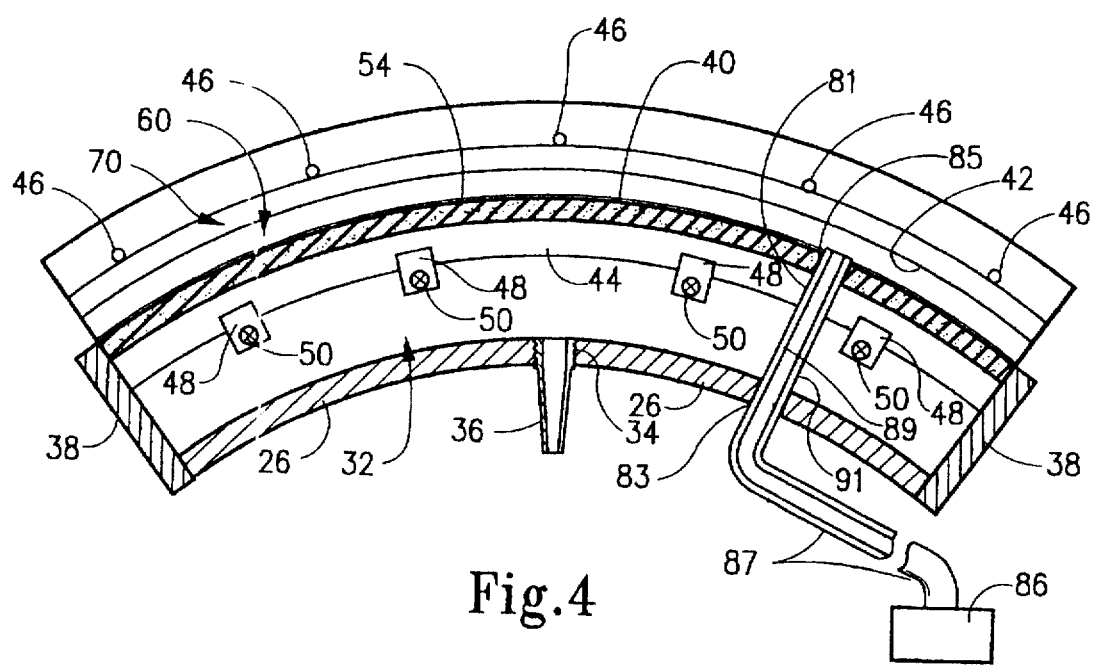
Fig.4

TAPE TRANSPORT APPARATUS INCORPORATING POROUS AIR BEARING

FIELD OF THE INVENTION

The present invention is generally directed to tape transport apparatus of the type employed in the data storage industry. More particularly, however, the present invention is directed to air bearings used with such tape transport apparatus which are operative to support a tape on a cushion of air as it is transported through the apparatus, especially across a read/write transducer.

BACKGROUND OF THE INVENTION

The advent of the information age has seen an exponential growth in the accumulation and storage of data both for on-line usage as well as for archival purposes. In the early days of the computer, before the advent of magnetic disk and optical storage assemblies, data was typically stored on magnetic tapes, such as reel-to-reel tapes and later cassettes. In a magnetic tape storage device, a magnetic coil is used as a transducer to imprint data magnetically on a moving band of magnetic film; thereafter, when the film is advanced across the transducer, the data may be read and re-input into the processor. Magnetic tape has an advantage in that it is relatively low cost and can be erased and rewritten many times. In addition to the medium of magnetic tape, other tape storage media have been developed or are possible. For example, optical tapes and laser tapes may be employed in an effort to increase the density of data stored on the medium.

Magnetic tape is still a highly desirable format for archiving data where the ability to rapidly access the data is of less significance and cost is of concern. The accessibility of data is a function of two variables, the density of storage and the speed at which the tape medium may be transported across and accurately read by the transducer. Here, also, it is important that a lateral edge of the tape be properly registered along a reference plane, called the datum, so that the data may be accurately interpreted.

In any event, where a tape medium is physically moved in a transport direction through a tape transport apparatus, it is necessary to both support the tape during transport and to hold a lateral edge thereof against the datum. Contact of the tape medium with the mechanical parts of the apparatus should be minimized, however, since physical contact between the tape and a mechanical part can cause abrasion of the tape surface or otherwise damage the tape. Such abrasions or damage can violate the integrity of the data stored thereon and can sometimes even damage parts of the drive mechanism. Thus, it is common to employ a plurality of air bearings in order to support the tape in order to reduce or eliminate friction and contact.

A typical air bearing is in the form of a plenum chamber which has a polished metal bearing surface through which a plurality of ports are drilled. These ports, which are typically on the order of 0.006 to 0.020 inches in diameter extend as a matrix over the bearing surface and communicate with the interior of the plenum. The plenum may be then pressurized with air which escapes through the ports thereby providing jets of air which form an air cushion to support the tape medium as it travels across the bearing surface.

While this type of air bearing is functional, it is not without its disadvantages. First, the manufacture of such air bearings is quite expensive since each of the bearing surface ports are individually drilled. Thus, for example, over a surface area of 1.5 to 3.0 square inches, it is not uncommon to drill 50 to 200 individual ports having this extremely small diameter. Not only is such drilling time consuming, the extremely small size of the drill bits lead to breakage of the bits. Accordingly, there is a relatively high scrap rate for the air bearings since a broken drill bit may become lodged in a port during the drilling process.

Even where a successful air bearing is formed of this type, it has a relatively limited openness since only approximately 0.1% of the surface is open due to the ports. Therefore, in order to provide sufficient air cushioning force, to resist the tension on the tape as it is transported, the plenum chambers must be maintained at a sufficient pressure, typically on the order of 1.0 to 3.5 psi. Due to compression of the air, heat is generated which heat must be dissipated; otherwise there is a risk of thermal damage to the tape.

As noted above, it is also necessary that one lateral edge of the tape be held against the datum so that data may be accurately read or written by the transducer. In the past, this technique has been accomplished by the use of a plurality of spring fingers which carry, at their distal ends, lubricous buttons which bear against a second lateral side edge of the tape, opposite the first lateral edge which is to be held against the datum. While this technique of physically biasing the tape against the datum has been successful, it still leads to undesired contact of the tape medium as it is transported at high speeds across the air bearing. This can cause excessive friction, and the mechanical biasing of the tape can cause damage to the tape edge. Moreover, the tape edge can eventually create undesired grooving of the buttons.

Accordingly, there remains a need for improved tape transport apparatus and, more particularly, for improved air bearings which can support a tape medium during rapid transport through such an apparatus. There is also a need for air bearings which eliminate the disadvantages attendant the individual drilling of ports through the bearing surface in order to provide air jets to form an air cushion that supports the tape. The present invention is directed to meeting these needs.

SUMMARY OF THE INVENTION

An object of the present invention is to provide a tape transport apparatus, and especially a new and useful air bearing therefor, which is constructed so as to provide an air cushion that supports a tape medium during transport.

Another object of the present invention is to provide an air bearing for use with tape transports which air bearing is easier to fabricate and is substantially less expensive than traditional air bearings.

Yet another object of the present invention is to provide an air bearing utilizing a bearing member which is substantially more open than existing air bearing members thereby to enable the air bearing to function at lower pressures.

Still a further object of the present invention is to provide a bearing member for an air bearing that may be integrally molded in a manner allowing the elimination of drilled ports therethrough.

Yet a further object of the present invention is to provide an air bearing member which is configured to cause the tape medium to automatically track against the datum plane during transport.

In order to accomplish these objects, then, the present invention is directed to a tape transport apparatus and, especially, to an air bearing used with a tape transport apparatus which air bearing is able to support a tape on a cushion of air as the tape is transported in a transport direction across the tape transport apparatus. Broadly, this air bearing includes a housing which has an air inlet adapted to be connected to an air source and a bearing member which is disposed on the housing and is located so that the tape is transported across a bearing surface thereof. This housing and bearing member are configured to form a plenum chamber having an interior in fluid communication with the air inlet. At least a portion of the bearing member is fabricated out of a porous material that allows pressurized air in the plenum to pass therethrough and out of the bearing surface to produce the cushion of air.

Alumina is a preferred constitution of the porous material although other compositions of ceramic, metals and composites are possible. These materials may be sintered or non-sintered, as necessary. The air bearing which is secured to the plenum is preferred to be fabricated entirely out of the porous material, and, if desired, the porous material may be impregnated with a selective adhesive. The porous material preferably is between 2% and 50% open. The bearing member also includes a datum face which is operative to define a guide surface for the first lateral edge of the tape with this datum face being oriented in a datum plane that is parallel to the transport direction of the tape through the transport apparatus. In order to maintain the first lateral edge of the tape against the datum face, the bearing surface is formed at a small obtuse angle relative to the datum plane. Preferably, this angle is selected so that the bearing surface is skewed at a slope of 0.002 to 0.020. With this structure, the bearing surface has a larger radius of curvature along a margin adjacent to the datum face than at a distal margin opposite the datum face so that the tension in the tape at a first margin along the first lateral edge will be under slightly greater tension than along the second lateral edge. This increased tension causes the tape medium to track against the datum face. Alternatively, the traditional resilient guide member including a plurality of lubricous contact buttons and spring fingers may be employed to maintain contact of the first lateral edge with the datum face.

The bearing member may also include a guide ramp face which helps to guide the tape medium as it is loaded onto the bearing surface. This guide ramp face intersects the datum face along a vertex line, with the guide ramp face being oriented at an acute angle relative to the datum plane. Preferably this angle is in a range of about 5° to 25°, preferably 20°. Moreover, a groove is formed between the datum face and the bearing surface with the groove being immediately adjacent the datum face. This groove insures a proper registration of the first lateral edge of the tape medium with the datum face.

Preferably, the housing is constructed of a cast aluminum material in the form of an arcuate, U-shaped channel. The bearing member is then disposed in this channel to form the plenum chamber. The bearing member can include an inner flange located in the plenum chamber with this flange being secured to the housing, for example, by clamping elements. An outer flange may project oppositely of the inner flange, and the datum face may be formed on this outer flange. Positioning posts may then be located on the U-shaped channel of the housing to position the bearing surface in a selected orientation, and end-plates may seal opposite ends of the channel to complete the plenum. Suitable adhesives may be provided to seal the opposite end surfaces of the bearing member and fasten the end-plates to the channel piece. A pressure sensor may be mounted in the plenum chamber to detect the pressure of the air therein.

The tape transport apparatus according to the present invention, then, further includes a transducer operative to read/write data on the tape member, and a plurality of air bearings, of the above described construction. A pressurized air source is connected to each plenum chamber of the air bearings, and a tape drive is operative to advance the tape in a transport direction across the air bearings and the transducer with the tape being supported on cushions of air produced by each of the air bearings during such transport.

These and other objects of the present invention will become more readily appreciated and understood from a consideration of the following detailed description of the exemplary embodiment(s) when taken together with the accompanying drawings, in which:

BRIEF DESCRIPTION OF THE DRAWINGS

FIG. 3 is a cross-sectional view taken about lines 3—3 of FIG. 2;

FIG. 4 is a cross-sectional view taken about lines 4—4 of FIG. 3;

FIG. 7 is a cross-sectional view, similar to FIG. 3, but showing a second exemplary embodiment of the present invention.

DETAILED DESCRIPTION OF THE EXEMPLARY EMBODIMENTS

The present invention is broadly directed to tape transport apparatus used in the data storage industry with the tape medium upon which data may be placed. The tape transport apparatus is operative to transport the tape medium in a transport direction across a read/write transducer in order to either place or access data onto the tape. While the present invention is described specifically with respect to magnetic tape media, it should be understood that the principles described herein may be employed with other tape media without restriction. Moreover, while the term "read/write transducer" as used herein may refer to a write transducer, a read transducer or a transducer that is able to perform both reading and writing functions.

The present invention is particularly directed, however, to an air bearing that is connectable to a pressurized air source in order to provide a cushion of air along a bearing surface thereof so that the tape medium may be supported on the cushion of air as it moves in the transport direction. Broadly, the air bearing of the present invention includes a housing having an air inlet adapted for connection to the air source and a bearing member which is disposed on the housing to create a plenum chamber in fluid communication with the pressurized air. This bearing member has at least a portion fabricated out of a porous material which allows passage of pressurized air therethrough and out of a bearing surface to produce the cushion of air. This material may be a ceramic material, a metal or a composite material that has a porosity preferably in the range of 2% to 50% open.

Figure 1:
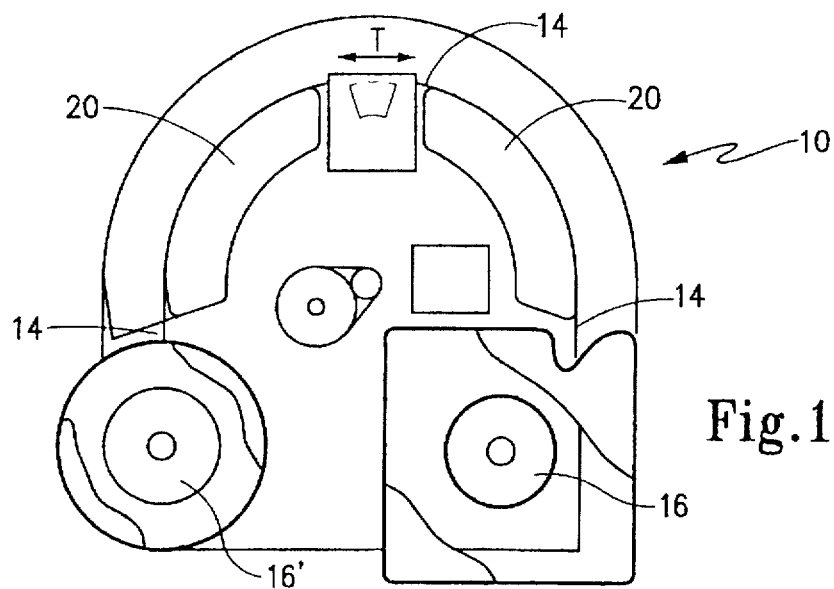
FIG. 1 is a front view in elevation showing a tape diagram of a tape transport apparatus according to the present invention including a plurality of air bearings according to the first exemplary embodiment of the present invention.
Figure 2:
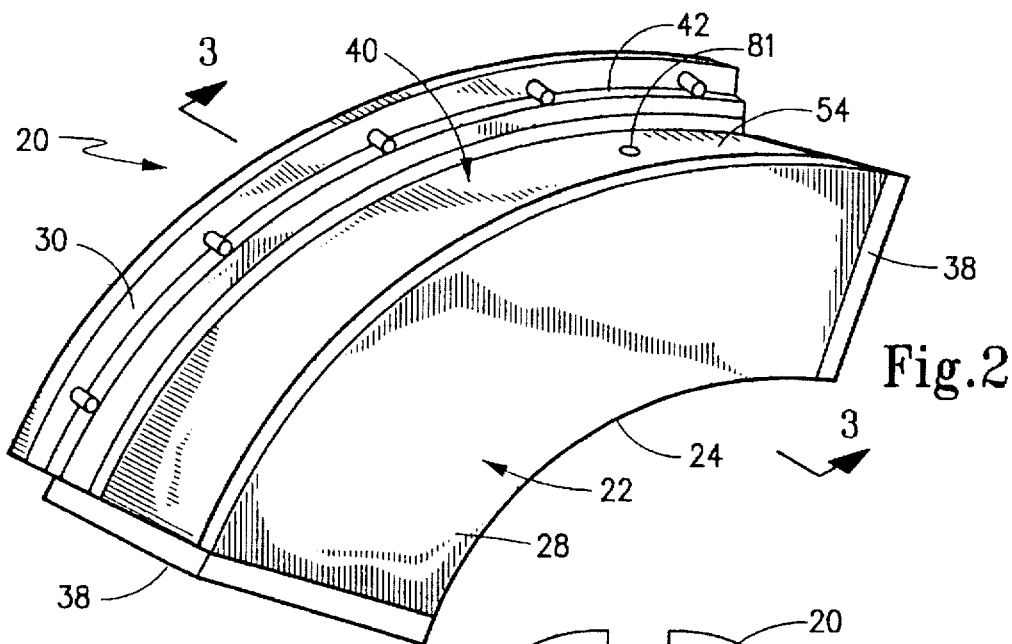
FIG. 2 is a perspective view of an air bearing according to the first exemplary embodiment of the present invention.

With this in mind, a diagram of a representative tape transport apparatus is shown in FIG. 1. Here, tape transport apparatus 10 includes a read/write transducer 12 and a plurality of air bearings 20 which support a tape 14 for transport in a tape transport direction "T". A suitable tape drive 16 is provided to move tape 14 in the transport direction.

A representative air bearing 20 is shown in FIGS. 2–5 where it may be seen that air bearing 20 includes a housing 22 formed by an arcuate U-shaped channel piece 24. Channel piece 24 has an arcuate bottom wall 26 and a pair of parallel sidewalls 28 and 30 to have an interior 32 therebetween. U-shaped channel piece 24 is preferably formed of cast aluminum or other suitable material that is impervious to the passage of air. However, housing 22 is provided with an air inlet in the form of a bore 34 through arcuate bottom wall 26 with bore 34 being provided with an air tube or threaded nipple 36 which can be attached to a source of pressurized air by any convenient conduit, as is known in the art.

A bearing member 40 is disposed on housing 22, and a pair of end plates 38 are provided for housing 22 to enclose opposite ends of U-shaped channel piece 24. End-plates 38 are fastened to channel piece 24 by a suitable adhesive or other technique, as desired. Accordingly, housing 22, including U-shaped channel 24 and end plates 38 along with bearing member 40 form a plenum chamber having interior 32 with this plenum chamber being in fluid communication with the air inlet formed by nipple 36.

Bearing member 40 is also arcuate in configuration and, to facilitate mounting and positioning in U-shaped channel piece 24, bearing member 40 includes an outer arcuate flange 42 which registers with a plurality of positioning posts 46 disposed on an inner side of sidewall 30. Bearing member 40 includes an inner flange 44 which projects into interior 32 to provide a mounting flange so that bearing member 40 may be secured to channel piece 24, for example, by means of a plurality of clamping elements 48 fastened to sidewall 30 by means of screws 50. Flanges 42 and 44 have a continuous, uninterrupted flat wall 52 which abuts inner side 31 of sidewall 30 in a substantially sealed manner. A bearing portion 54 of bearing member 40 projects substantially perpendicularly to flanges 42 and 44 and provides a bearing surface 56 across which tape 14 may be transported.

At least a portion of bearing portion 54 is fabricated out of a porous material that allows pressurized air in plenum interior 32 to pass therethrough and out of bearing surface 56 in order to produce a cushion of air 58 that supports tape 14 above bearing surface 56, as is shown in FIG. 3. Preferably, however, bearing member 40, including flange 42, flange 44 and bearing portion 54 are integrally formed as a single piece of porous material so that bearing member 40 is entirely fabricated of the porous material. This porous material may be any suitable composition including, for example, ceramics, metals and composites, so long as they are sufficiently open to permit passage of air in a quantity able to create the air cushion. It is preferred that the porous material be between 2% and 50% open. The porous material may be sintered or non-sintered, depending on its composition, and likewise may be impregnated with a selected adhesive to control porosity. Where metal is used, it should be non-magnetic if intended for use with magnetic tape media. The preferred porous material is alumina.

Figure 6:
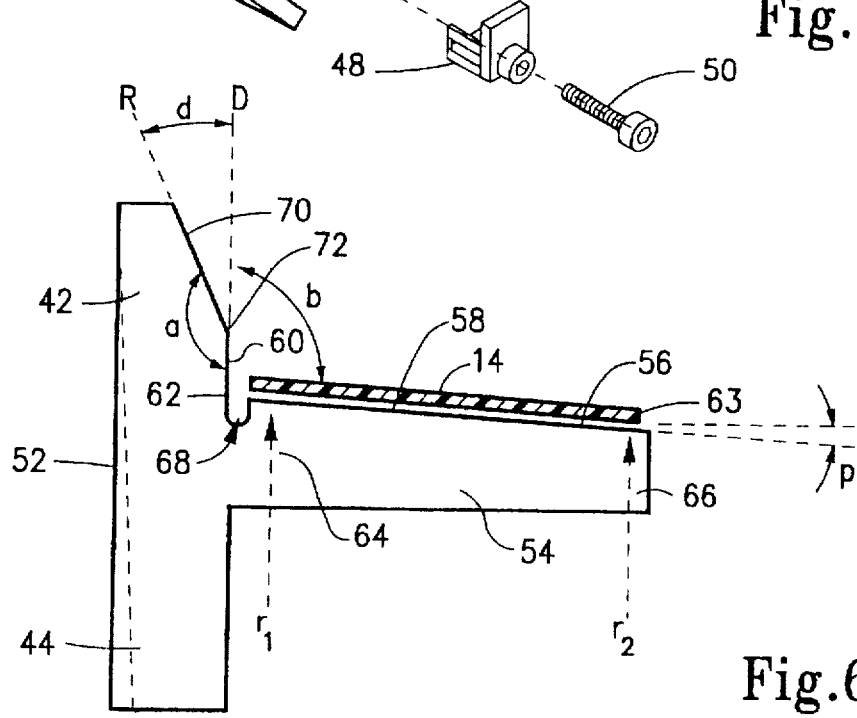
FIG. 6 is a diagrammatic view of a cross-section of the bearing member according to the first embodiment of the present invention.

The additional structure bearing member 40 may be seen in reference FIGS. 3 and 6 where it may be seen that bearing member 40 includes a datum face 60 that is operative to define a guide surface for a first lateral edge 62 of tape 14. This datum face 60 is oriented in a datum plane "D" that is generally parallel to the direction of transport "T" of tape 14. As is shown in FIG. 6, bearing surface 56 is located along a surface "P" that is oriented at a right angle relative to the datum plane "D". Datum plane "D", however, is canted slightly so that bearing surface 56 is skewed to have a higher lateral edge adjacent datum plane "D" than at the opposite lateral edge. Accordingly, where bearing surface 56 is arcuate in shape, a proximal portion 64 of bearing portion 54 which is adjacent datum face 60 has a larger radius of curvature "$r_1$" than the distal portion 66 which has a radius of curvature "$r_2$". With this orientation, bearing surface 56 has a slope when viewed from the perspective of tape 14; this slope is preferably between 0.002 and 0.020. In other words, bearing surface 56 is at a small acute angle "c" between about 2° and 5° relative to a line perpendicular to flat wall 52. Thus, as tape 14 tracks across bearing surface 56, on air cushion 58, a margin adjacent first lateral edge 62 will be at a slightly larger tension then a margin adjacent second lateral edge 63. Thus, the higher tension at lateral edge 62 will cause tape 14 to track against datum 60 for proper registration as tape 14 passes across transducer 12.

In order to assure a shape angle at the junction of tape 14 and datum face 60, a groove 68 is formed at the intersection of bearing surface 56 and datum face 60. This groove may be cut into bearing portion 54 so that bearing surface 56 is spaced from datum fact 60 by the width of groove 68. By cutting groove 68 in bearing portion 54, the presence of asperities along the datum face 60 may be reduced to increase accuracy of tracking. That is, groove 68 prevents the presence of any curvature in the junction between bearing surface 56 and datum face 60 where any unwanted asperities which would interfere with the tracking of first lateral edge 62 on datum face 60.

Flange 42 may also include a guide ramp face 70 which is oriented at a large obtuse angle "a" with respect to datum face 60, that is, at a ramp plane "R" that is a small acute angle "d" with respect to datum plane "D". Angle "d", as is shown in FIG. 6, is preferably on the range of 5° to 25°, but preferably about 20°. Guide ramp face 70 accordingly intersects datum face 60 along vertex line 72, as is shown in FIG. 6.

Figure 5:
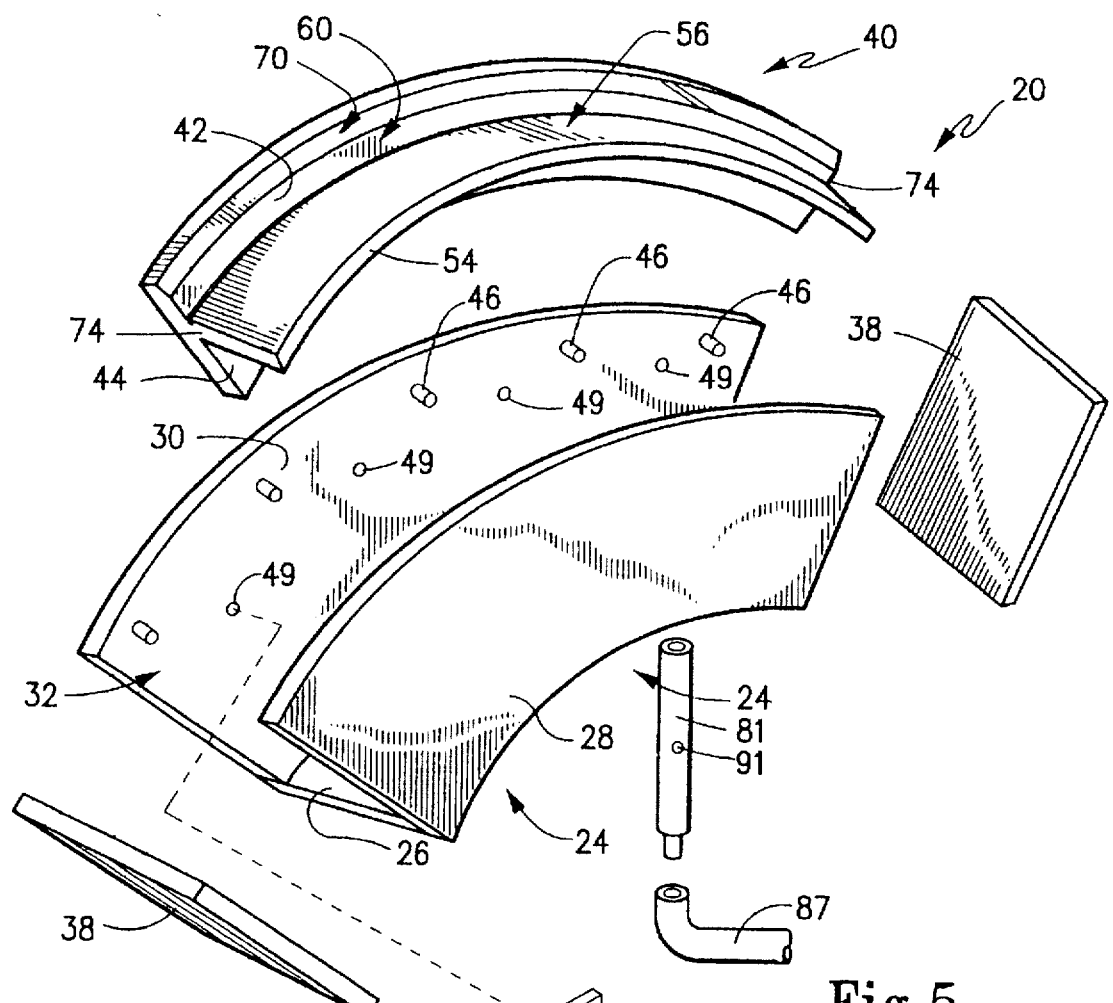
FIG. 5 is an exploded perspective view of the first exemplary embodiment of the air bearing shown in FIGS. 2–4.

The assembly of air bearing 20 may now be best seen in reference to FIG. 5. As is shown in this Figure, bearing member 40 may be inserted into the interior 32 with flange 42 being positioned against positioning post 46 for proper alignment. Bearing member 40 is then clamped into position by a plurality of clamp members, such as the exemplary clamp member 48 which is mounted onto sidewall 30 by means of screws 50 extended into threaded bores 49 therein. Opposite ends 74 of bearing member 40 may be provided with an adhesive coating 76 and end faces 78 of channel 24 may also be provided with an adhesive 76 so that end plates 38 may be secured both to end surfaces 74 and 78 to form the plenum chamber. Adhesive 76 may be any suitable adhesive material that is formulated to substantially seal the end surfaces 74 of bearing member 40 against the egress of air.

Figure 8:
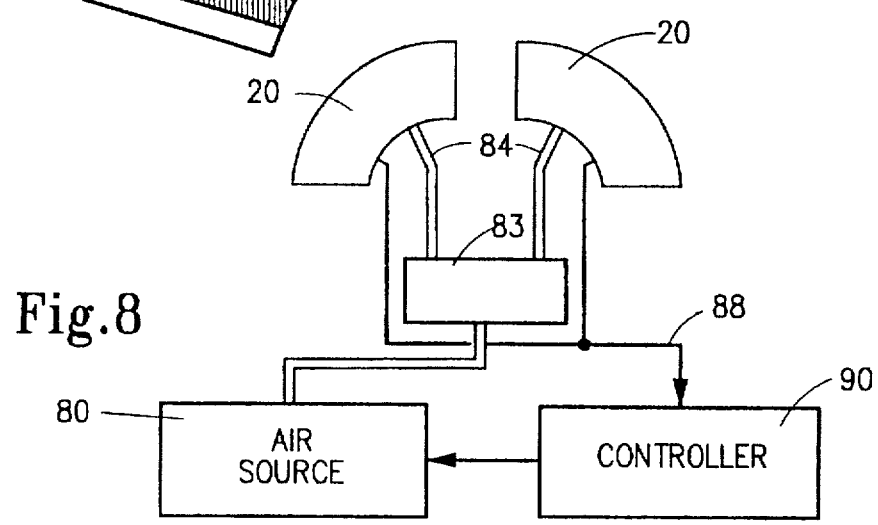
FIG. 8 is a diagrammatic view showing a pair of air bearings according to the present invention in communication with a pressurized air source and a controller.

As is shown in FIG. 8, each air bearing, such as air bearing 40, may be in fluid communication to an air source 80 by means of suitable conduits 82 and 84 with conduits 84 being connected to nipple 36. Different pressure sensors 86, such as shown in FIGS. 3–5 are provided. Here, a sensor tube 81 extends through ports 83 and 85 in U-shaped channel piece 24 and bearing portion 56 and is connected to an air tube 87. Sensor tube 81 has a central passageway 89 that has an open mouth that communicates with bearing surface 56 so as to be at the pressure condition existing between tape 14 and bearing surface 56. Passageway 89 is about 0.040 inch in diameter. A radial port 91, approximately 0.010 inch, is formed through the sidewall of sensor tube 81. Thus, the passageway 89 is exposed not only to the pressure condition between tape 14 and bearing surface 56 but also to the pressure in the interior 32 of the plenum chamber. This creates a pressure differential that is monitored by sensor 86 to control the pressurization of the plenum chamber and thus control the pressure which provides the air cushion for tape 14. Electrical leads 88 communicate this signal from sensors 86 to a controller 90 which monitors and controls the pressure supplied by air source 80. If desired, as is shown in FIG. 8, air bearings 40 may be interconnected by conduits 84 to a common manifold 83.

An alternative construction of bearing member 40 is shown in FIG. 7. Here, the inclined bearing surface 56 is eliminated so that bearing surface 156 is oriented substantially perpendicular to datum fact 160 of bearing member 140. Here, again, bearing portion 154 is constructed of a porous material so that air cushion 158 supports tape 14 above bearing surface 156. However, this construction does not cause the automatic tracking of the first lateral edge of tape 14 against datum face 160.

In FIG. 7, a guide member 180 is provided with a plurality of guide fingers that have ceramic contact buttons 182 supported at distal ends of spring fingers 184 that are secured to guide 180. Spring fingers 184 bias buttons 182 against the second lateral edge 63 of tape 14 so that tape 14 is resiliently biased toward datum plane 160. This maintains first lateral edge 62 in contact with datum face 160 so that tape 14 is properly registered with respect to transducer 12.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. An air bearing adapted for use on a tape transport apparatus and connectable to an air source and operative to support a tape on a cushion of air as said tape is transported in a transport direction thereacross, comprising:

(a) a housing including a channel piece having a bottom and a pair of spaced-apart sidewalls and including end closures disposed on each opposite end of said channel piece and extending between said sidewalls thereby to define an interior for said housing, said housing including an air inlet in fluid communication with the interior and adapted for connection to said air source; and (b) a bearing member having a non-helical bearing surface, said bearing member disposed on said housing and extending between said sidewalls from one end closure to another end closure in spaced relation to the bottom of said channel piece thereby to enclose the interior to form a plenum chamber in fluid communication with said air inlet, said bearing member located so that said tape is transported across the non-helical bearing surface in a transport direction from one end closure to another, said bearing member being fabricated out of a porous material that allows pressurized air in the plenum chamber to pass therethrough and out of the bearing surface to produce the cushion of air.

2. An air bearing according to claim 1 wherein said porous material is selected from a group consisting of ceramics, metals and composite materials.

3. An air bearing according to claim 2 wherein said porous material is a ceramic material impregnated with a selected adhesive.

4. An air bearing according to claim 2 wherein said porous material is alumina.

5. An air bearing according to claim 1 wherein said porous material is between two and fifty percent open.

6. An air bearing according to claim 1 wherein said channel piece is arcuate in configuration with said bottom being arcuate and with said sidewalls being parallel to one another so that said channel piece has a U-shaped cross-section.

7. An air bearing according to claim 1 wherein said bearing member includes a datum face operative to define a guide surface for a first lateral edge of said tape, said datum face oriented in a datum plane that is parallel to the transport direction.

8. An air bearing according to claim 7 wherein said bearing surface has a slope of between 0.002 and 0.020.

9. An air bearing according to claim 7 wherein said bearing member has a groove formed in said bearing surface immediately adjacent said datum face, said groove having a groove width such that said bearing surface is spaced from said datum face by the width of said groove.

10. An air bearing according to claim 7 including a resilient guide member spaced from said datum face and operative to engage a second lateral edge of said tape and bias said tape to maintain contact between the first lateral edge of said tape and said datum face.

11. An air bearing according to claim 10 wherein said resilient guide member includes a plurality of contact buttons operative to contact the second lateral edge of said tape, each said button being disposed on and supported by a respective spring finger so as to be biased against the second lateral edge of said tape.

12. An air bearing according to claim 7 wherein said bearing member includes a guide ramp face intersecting said datum face along a vertex line, said guide ramp face and said datum plane oriented at an acute angle relative to one another.

13. An air bearing according to claim 12 wherein said acute angle is in a range of 5° to 25°.

14. An air bearing according to claim 1 wherein said bearing surface is arcuate in configuration.

15. An air bearing according to claim 1 including a pressure sensor in the plenum chamber, said pressure sensor operative to monitor pressure of air therein.

16. An air bearing adapted for use on a tape transport apparatus and connectable to an air source and operative to support a tape on a cushion of air as said tape is transported in a transport direction thereacross, comprising:

(a) a housing having an air inlet adapted for connection to said air source;

(b) a bearing member disposed on said housing and located so that said tape is transported across a non-helical bearing surface thereof, said housing and said bearing member configured to form a plenum chamber having an interior in fluid communication with said air inlet, said bearing member fabricated out of a porous material that allows pressurized air in the plenum chamber to pass therethrough and out of the bearing surface to produce the cushion of air; and (c) a planar datum face operative to define a guide surface for a first lateral edge of said tape, said datum face oriented in a datum plane that is parallel to the transport direction, said bearing surface oriented at a small obtuse angle with respect to said datum face such that said bearing surface has a slope of between 0.002 and 0.020 and is thereby operative to urge an edge of said tape against said datum face during transport thereof across said bearing surface.

17. An air bearing according to claim 16 wherein said bearing member includes an inner flange disposed in the plenum chamber and secured to said housing thereby to mount said bearing member thereto.

18. An air bearing according to claim 17 wherein said bearing member includes an outer flange projecting oppositely of said inner flange, said datum face being formed on said outer flange.

19. An air bearing according to claim 18 wherein said bearing member is arcuate in configuration.

20. An air bearing according to claim 16 wherein said porous material is selected from a group consisting of ceramics, metals and composite materials.

21. An air bearing according to claim 20 wherein said porous material is between two and fifty percent open.

22. An air bearing according to claim 16 wherein said bearing surface has a slope of between 0.002 and 0.020.

23. An air bearing according to claim 16 wherein said bearing member has a groove formed in said bearing surface immediately adjacent said datum face, said groove having a groove width such that said bearing surface is spaced from said datum face by the width of said groove.

24. An air bearing according to claim 16 wherein said housing includes a plurality of positioning posts located to engage said bearing member thereby to position said bearing surface in a selected orientation.

25. A tape transport apparatus adapted to receive a tape medium and to transport said tape medium in a transport direction in order to read/write data thereon, comprising:

(a) a transducer operative to read/write data on said tape medium;

(b) a plurality of air bearings, there being at least a first air bearing on one side of said transducer relative to the transport direction and a second air bearing on an opposite side of said transducer relative to the transport direction, each of said air bearings including:

(i) a housing having an air inlet adapted for connection to said air source; and (ii) a bearing member disposed on said housing and located so that said tape is transported across a non-helical bearing surface thereof, said housing and said bearing member configured to form a plenum chamber having an interior in fluid communication with said air inlet, said bearing member having at least a portion thereof fabricated out of a porous material that allows pressurized air in the plenum chamber to pass therethrough and out of the bearing surface to produce a cushion of air;

(c) a pressurized air source operative to supply pressurized air to each said plenum chamber; and (d) a tape drive operative to advance said tape in the transport direction across said air bearings and said transducer, said tape being supported during transport on the cushion of air produced by each said air bearing.

26. An air bearing adapted for use on a tape transport apparatus and connectable to an air source and operative to support a tape on a cushion of air as said tape is transported in a transport direction thereacross, comprising:

(a) a housing having an air inlet adapted for connection to said air source;

(b) a bearing member disposed on said housing and located so that said tape is transported across a non-helical bearing surface thereof, said housing and said bearing member configured to form a plenum chamber having an interior in fluid communication with said air inlet, said bearing member having at least a portion thereof fabricated out of a porous material that allows pressurized air in the plenum chamber to pass therethrough and out of the bearing surface to produce the cushion of air;

(c) a datum face operative to define a guide surface for a first lateral edge of said tape, said datum face oriented in a datum plane that is parallel to the transport direction; and (d) a guide ramp face intersecting said datum face along a vertex line, said guide ramp face and said datum plane oriented at an acute angle relative to one another.

27. An air bearing according to claim 26 wherein said guide ramp face and said datum face are formed integrally with one another on a common piece of material.

* * * * *